March 25, 1969 F. REGGIA 3,435,250

SOLID STATE MICROWAVE ACOUSTIC DELAY LINE AND FREQUENCY CONVERTER

Filed Aug. 18, 1967

INVENTOR,
FRANK REGGIA

BY Harry M. Saragovitz
Edward J. Kelly, Herbert Berl
& J. D. Edgerton

ATTORNEYS

United States Patent Office 3,435,250

Patented Mar. 25, 1969

3,435,250

SOLID STATE MICROWAVE ACOUSTIC DELAY LINE AND FREQUENCY CONVERTER

Frank Reggia, Bethesda, Md., assignor to the United States of America as represented by the Secretary of the Army Filed Aug. 18, 1967, Ser. No. 661,728
Int. Cl. H02m 5/04, 5/16
U.S. Cl. 307—88.3 4 Claims

ABSTRACT OF THE DISCLOSURE

A microwave acoustic delay line and frequency converter as might be used in radar systems in which the signal, such as might be available from the transmitter, is introduced into a delay medium, and this delayed signal is coupled to a piezoelectric crystal medium into which is also coupled a small signal input which might be the target return signal. In this latter crystal medium the delayed signal and the small signal (amplified) are heterodyned producing a difference frequency output. In one embodiment the delay medium and the non-linear amplifier medium are of different crystal materials but in an alternate embodiment the delay medium and the non-linear amplifier medium are of the same material and are a unitary structure.

The invention described herein may be manufactured, used, and licensed by or for the Government for governmental purposes without the payment to me of any royalty thereon.

*Background of the invention*

In the design of certain types of radar systems it is necessary to compare the transmitted signal with the target return signal. In this situation it is necessary to delay a sample of the transmitted signal by an amount of time equal to that required for the transmitted signal to travel to the target and return to the receiver. Presently, the delay lines available for such an application offer less than desirable characteristics and often resort must be had to elaborate mixing systems to avoid the problems presented. In particular, the delayed signal with which the target return signal is heterodyned must be at a level of approximately 1 milliwatt. Presently available microwave delay lines are not capable of presenting this magnitude of power to the mixer.

It is therefore an object of this invention to provide a delay line for use at microwave frequencies which is capable of producing a relatively high power output.

Another object of this invention is to provide a means of avoiding the necessity of using complex space-consuming mixing systems to produce delays and for heterodyning the delayed signal with another signal in microwave systems.

*Summary of the invention*

The aforementioned and other objects are achieved by introducing the microwave signal to be delayed into a crystalline material such as sapphire ($Al_2C_3$), lithium metaniobate ($LiNbO_3$) or similar acoustic delay material. The output of the delay means may then be coupled into another crystalline material such as cadmium sulfide (CdS) or zinc oxide (ZnO) where it will be amplified and heterodyned with another signal. A single piezoelectric material such as cadmium sulfide or zinc oxide may be used for the acoustic delay, amplification and heterodyning functions.

*Brief description of the drawings*

The specific nature of the invention as well as other objects, aspects, uses and advantages thereof will clearly appear from the following description and from the accompanying drawing in which.

*Description of the preferred embodiment*

Figure 1:
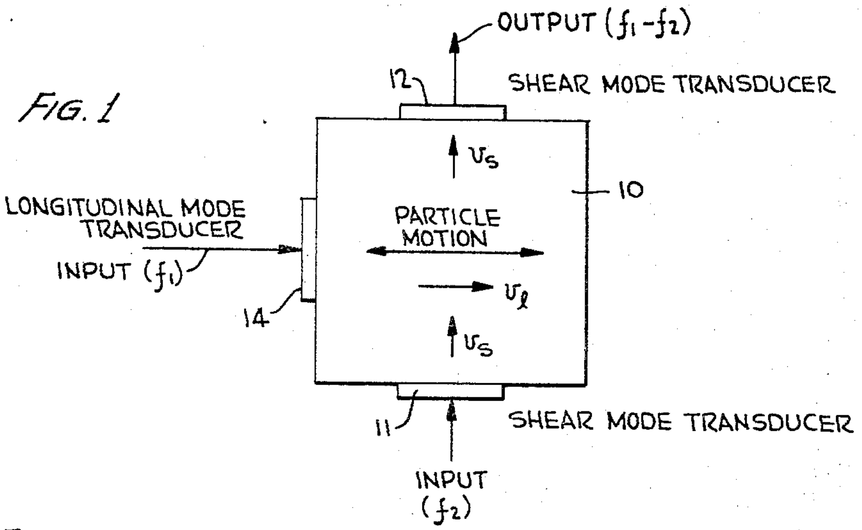
FIGURE 1 is a view of the crystalline material used to obtain a non-linear amplifier characteristic.
Figure 2:
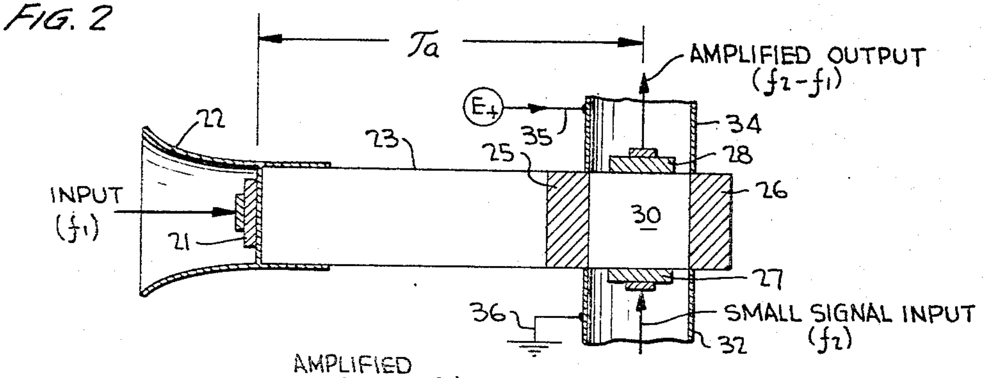
FIGURE 2 is a side view of one embodiment of my invention using different materials to form the delay medium and the non-linear amplifier.
Figure 3:
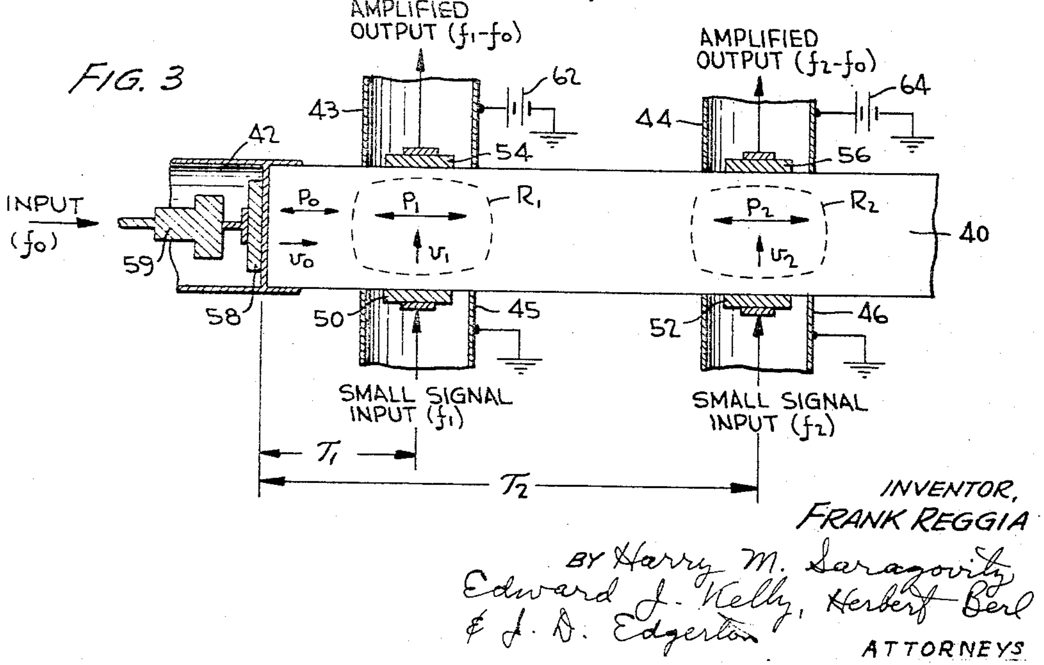
FIGURE 3 is a side view of a second embodiment of my invention using the same material to form the delay medium and the non-linear amplifier in a unitary structure.

In FIGURE 1 is shown an example of how non-linear amplification is obtained in the embodiments of FIGURES 2 and 3. It is known to those skilled in the art that in crystalline materials such as zinc oxide and cadmium sulfide acoustic amplification may be obtained at microwave frequencies. Further, it has been demonstrated that when such materials are adjusted to have a properly low resistivity and the correct DC bias voltage for a given frequency the result will be non-linear acoustic amplification. For example, when two acoustic waves having different frequencies, $f_1$ and $f_2$ respectively, and correct polarization are applied to a crystalline material 10, such as cadmium sulfide or zinc oxide, having non-linear characteristics, interaction of the individual article motions caused by the two waves will result in heterodyning at the output. In FIGURE 1 the wave having a frequency $f_1$ is introduced into crystal 10 by means of a longitudinal mode transducer 14 which converts the microwave energy to acoustic energy and will cause longitudinal particle motion $v_1$ in crystal 10. A second frequency wave $f_2$ is coupled to shear mode transducer 11 which produces shear mode particle motion $v_s$ in crystal 10. Interaction of the two particle motions $v_1$ and $v_s$ (in the same direction) will result in a heterodyned signal being available at output transducer 12. Although sum and difference frequencies are produced, output transducer 12, in effect, discriminates and only the difference signal is available at the output. The instantaneous amplitude of the envelope of the output difference signal is determined by an equation well known to those skilled in the art as follows:

$$A_1=\sqrt{A_s^2+A_0^2+2A_sA_0 \cos \omega_d t}$$

where:

$A_1$=instantaneous amplitude of envelope
$A_s$=amplitude of one acoustic wave
$A_0$=amplitude of a second acoustic wave
$\omega_d/2\pi$=difference frequency of above two acoustic waves This envelope consists of a constant component upon which is superimposed a difference frequency component.

Referring to FIGURE 2, an embodiment of my invention utilizing the phenomenon discussed in FIGURE 1 is shown. In this embodiment a coaxial connector 22 receives a microwave signal such as that which might be obtained from a radar transmitter and by means of transducer 21 this signal is converted into longitudinal mode acoustic energy and coupled to delay medium 23. This delay medium might be any of several well known crystal materials having a high resistivity, such as sapphire or lithium metaniobate ($LiNbO_3$). The delayed acoustic signal is coupled to non-linear amplifier 30 by means of an acoustic matching impedance 25. A small signal such as the target return signal in a radar system is coupled to non-linear amplifier 30 by means of coaxial connector 32 and shear mode transducer 27 in the manner described in FIGURE 1. In non-linear amplifier 30 the heterodyning, as discussed with reference to FIGURE 1, occurs and output transducer 28 senses the difference frequency which is coupled to an output load by means of coaxial connector 34. As discussed with reference to FIGURE 1, in order to obtain the non-linear amplifier characteristic in crystals, such as zinc oxide or cadmium sulfide which might be used in non-linear amplifier 30, it is necessary to provide a proper DC bias. In this embodiment this is accomplished by connecting leads 35 and 36 respectively, to a positive DC voltage and ground. Element 26 attached to the face of non-linear amplifier 30 opposite the acoustic matching impedance is an acoustic absorber.

By introducing a signal of a frequency $f_1$, for example, the signal from the radar transmitter, into connector 22 the microwave energy will be converted to acoustic energy by transducer 21 and acoustic delay line 23 will introduce a delay of a predetermined magnitude $\tau_a$. This delayed signal will be heterodyned in non-linear amplifier 30 with a small signal input such as the target return signal in a radar system. The result will be an amplified difference signal $f_2-f_1$ which might contain important information such as range of velocity.

In FIGURE 3 is shown another embodiment of my invention in which a single crystalline material is used to provide both the delay medium and the non-linear amplifier. An input $f_0$ may be introduced into the device through connector 42 the center conductor of which is a stepped electromagnetic impedance matching region 59. Conductor 59 is connected to an electro-acoustic transducer 58 which, operating in the compressional or longitudinal mode, changes the electromagnetic microwave energy to acoustic energy. Connectors 45 and 46 containing transverse mode transducers 50 and 52, respectively, introduce small signals $f_1$ and $f_2$, respectively into crystal 40 to be heterodyned with signal $f_0$. The resultant output signals $(f_1-f_0)$ and $(f_2-f_0)$ are made available at connectors 43 and 44, respectively, by means of electro-acoustic transducers 54 and 56, respectively. Transducers 50, 52, 54 and 56 all operate in the shear mode and are attached to crystal 40 which may be of a material such as cadmium sulfide or zinc oxide. DC sources 62 and 64 provide the necessary bias for the non-linear amplifier activity, conducting through the small signal input and output connectors, crystal 40, and ground. $P_0$, $P_1$ and $P_2$ indicate the directions of particle motions resulting from the inputs of transducers 58, 50 and 52, respectively, and $v_0$, $v_1$ and $v_2$ indicate the velocity of propogation of the individual acoustic waves introduced by signals $f_0$, $f_1$ and $f_2$, respectively. It is to be noted that the velocity of propagation $v_0$ of signal $f_0$ will not be equal to $v_1$ or $v_2$ which are equal to each other. When the electron drift velocity reaches a value approximately equal to the acoustic wave velocity, because of the DC voltages applied from sources 62 and 64, the shear mode acoustic $v_1$ and $v_2$, respectively, are amplified. Further non-linear amplification occurs in regions $R_1$ and $R_2$ respectively, as discussed with reference to FIGURE 1. The materials used for crystal 40 are capable of acting as acoustic delay lines, as well, in the well known manner, but results realized for delay purposes will be slightly less satisfactory than if materials such as those used in the embodiment of FIGURE 2 are used.

When a signal $f_0$ is introduced into connector 42, it will be converted to an acoustic wave and delayed by an amount of time $r_1$ and heterodyned with small $f_1$ in the region $R_1$. The resultant amplified output $f_1-f_0$ will be available by means of transducer 54 and connector 43. The acoustic wave resulting from signal $f_0$ will continue down crystal 40 being delayed by an amount of time $\tau_2$ and will be further heterodyned with small signal input $f_2$ in region $R_2$, and resultant amplified output $f_2-f_0$ will be available at connector 44 by means of transducer 56.

Although my invention has been described in the context of its usefulness in radar systems, it will be apparent to those skilled in the art that a wide variety of other applications exist. It will further be apparent that the embodiments shown are only exemplary and that various modifications can be made in construction and arrangement within the scope of the invention as defined in the appended claims.

I claim:

1. A microwave delay line and acoustic frequency converter, comprising:

(a) a first input means for receiving electromagnetic microwave energy and for converting said microwave energy into acoustic waves;

(b) a first block of crystalline material adapted to receive acoustic waves from said first input means and having the property that when said acoustic waves travel the length of said first crystal a predetermined time delay is introduced;

(c) a second input means for receiving electromagnetic microwave energy and for converting said microwave energy into acoustic waves;

(d) a second block of crystalline material adapted to receive said delayed acoustic waves from said first crystal and said acoustic waves from said second input means, and having the property that the interaction of the particle motions caused by said two sets of acoustic waves will result in a heterodyning of said two sets of acoustic waves; and (e) an output means adapted to receive the heterodyned acoustic waves from said second crystal for converting said heterodyned acoustic waves into electromagnetic microwave energy producing a signal the frequency of which is the difference between the signal frequencies coupled to said first input and said second input, respectively.

2. The microwave delay line and acoustic frequency converter of claim 1 in which said first input means introduces a longitudinal mode acoustic wave into said first crystal and said second input means introduces a shear mode acoustic wave into said second crystal.

3. A microwave acoustic delay line and frequency converter, comprising:

(a) a block of crystalline material having the properties that an acoustic wave travelling in said crystal in the longitudinal mode will be delayed a predetermined amount of time and the interaction of the individual particle motions of said longitudinal acoustic wave and a shear mode acoustic wave will produce non-linear amplification;

(b) a first input means for receiving electromagnetic microwave energy and for converting said microwave energy into a longitudinal mode acoustic wave, said first input means being attached to said crystal and adapted to introduce said longitudinal acoustic wave into said crystal;

(c) a second input means for receiving electromagnetic microwave energy and for converting said microwave energy into a shear mode acoustic wave, said second input being attached to said crystal and adapted to introduce said shear wave into said crystal; and (d) an output means for receiving the resultant heterodyned signal produced by the interaction in said crystal of said longitudinal wave and said shear wave and for converting said resultant signal into electromagnetic microwave energy producing a microwave signal output the frequency of which is the difference between the frequencies of the microwave signals introduced into said first input and said second input, respectively.

4. The microwave acoustic delay line and frequency converter of claim 3 in which a plurality of second input means are spaced along one surface of said crystal and a plurality of output means are placed along another surface of said crystal the number of outputs equaling the number of second inputs, whereby each output means will make available an output signal the frequency of which is the difference between the signal coupled to said first input and the signal coupled to the second input means associated with the particular output means.

References Cited

UNITED STATES PATENTS

| | | | |
|---|---|---|---|
| 3,200,354 | 8/1965 | White | 330—5.5 |
| 3,293,557 | 12/1966 | Denton | 330—4.6 |
| 3,360,770 | 12/1967 | Friedman et al. | 330—4.5 |

JOHN KOMINSKI, *Primary Examiner.*

U.S. Cl. X.R.

330—5.5; 331—37